Sept. 13, 1966 T. B. HEYERDAHL 3,272,514

TONE ARM WITH RETRACTABLE CARTRIDGE AND STYLUS ASSEMBLY

Filed Sept. 13, 1965

Torjus B. Heyerdahl
INVENTOR.

BY Clarence A. O'Brien
and Harvey B. Jacobson
Attorneys

United States Patent Office 3,272,514

Patented Sept. 13, 1966

3,272,514
TONE ARM WITH RETRACTABLE CARTRIDGE AND STYLUS ASSEMBLY

Torjus B. Heyerdahl, 3311 Winsome Road, Boise, Idaho

Filed Sept. 13, 1965, Ser. No. 486,941
8 Claims. (Cl. 274—24)

The present invention relates to a phonograph tone arm wherein the sound pickup means, generally referred to as the cartridge and stylus assembly, is structurally and functionally novel and is characterized by self-contained features which render said assembly automatically retractable and, in this manner, to minimize damage to either the cartridge and stylus assembly or the playback grooves provided, as is commonly the case, in the reversible sides of the record or disk.

The general objective of the concept herein revealed is to reduce record and stylus damage to a practical minimum. To the ends desired a record tracking stylus will, when constructed in accordance with the present invention, virtually do away with scratching, impairing, or ruining the grooves of the record. Irreparable damage is currently and customarily encountered when the stylus-equipped cartridge is accidentally dropped, bangs against and often ruins the record's surfaces. Carelessness and indifference often cause the tone arm to travel crosswise of the grooves of the record with the result that the needle-sharp stylus carried by the pickup or cartridge scratches and defaces the surface contacted thereby. As a result such records are not only unsightly but are amply ruined to detract from the listening pleasure and result in ultimate disposition of the record.

In carrying out the principles of the present invention the cartridge and stylus unit or assembly is electrically wired as usual. On the other hand, it is supported in the hollow space or chamber of the hollow tone arm in a novel and improved manner. In fact, and to the ends desired, cradling means is pivotally mounted intermediate its ends on aligned horizontal axes between side walls of the elongated tone arm so that the end portions of the cradling means are allowed to tilt and thus provide a rockable support one end portion of which is provided with the cartridge and stylus assembly, the other end portion being provided with openable and closable coupling means interposed between a wall of the tone arm and and end portion of the cradling means.

More specifically, the invention has to do with a simple elongated or rectangular cradling plate which is preferably made of non-magnetic material, plastic material if desired, said plate having its intermediate portion provided with mounting and hinging means which is journaled in bearings provided therefor in the opposed side walls of the tone arm. The underneath side of one end portion supports or suspends the cartridge and record groove tracking stylus. The other end portion is provided with a magnetizable component which may be designated as a contact element and which is movable toward and from and cooperates with a relatively stationary electromagnet. These cooperating members provide an electromechanical coupling which is wired to come into play at the desired time. Spring means is interposed between and connects the other end portion of the plate with a cooperating top wall of the tone arm.

The concept is such, more specifically revealed, that it utilizes simple coil spring means at one end of the centrally hinged tiltable plate, a fixed bumper for said end portion, and magnetic means at the other end, the intermediate or median portion of the plate having a trip lever or trigger attached thereto with the same extending through an opening or aperture provided therefor in the top wall of the tone arm where it terminates in a finger grip which enables the user of the tone arm to safely control the functioning thereof with impairment of the record and cartridge assembly reduced to an acceptably efficient minimum.

At the end of the record's groove, the tone arm returns to the usual tone arm support. Here it remains until another record is to be played. If an automatic record player and another record is waiting to be played it will function as normal, until the last record is played. At the end, when the tone arm returns to its support and the record player automatically turns itself off, the stylus will then be retracted into the tone arm by the spring. This completes the cycle of events during normal operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3, 4, 5:
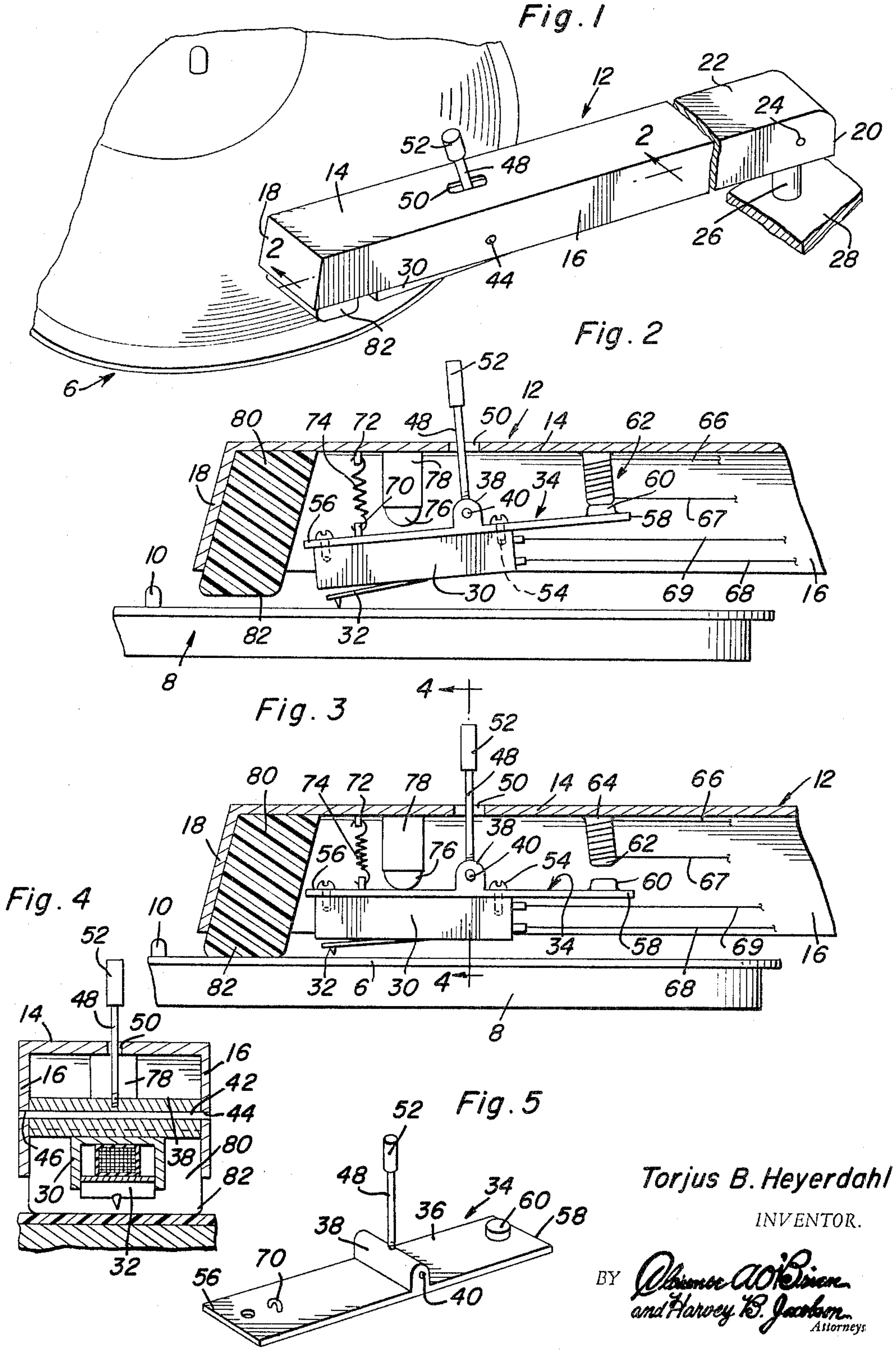
FIG. 1 is a view showing a turntable with a record or disk, a tone arm cooperable therewith but characterized by the improved retractable cartridge and stylus assembly or means constructed, of course, in accordance with the principles of the present invention.
FIG. 2 is a view on an enlarged scale and which is fragmentarily shown and appears in section and elevation and is taken on the plane of the section line 2—2 of FIG. 1.
FIG. 3 is a view like FIG. 2 which shows the manner in which the cartridge and stylus assembly is safely retracted and how the protruding end portion of the safety limit stop comes to rest against the surface too, in this manner, virtually prevent phonograph record change.
FIG. 4 is a view taken on the plane of the section line 4—4 of FIG. 3.

And FIG. 5 is a view in perspective of the adapter plate and manually actuatable trigger or trip lever.

Referring now to the views of the drawing and with particular reference to FIG. 1, the phonograph disk or record, which is conventional, is denoted by the numeral 6. It is mounted atop the turntable 8 (FIG. 2) and held in place as is customary by the centering stud 10. The elongated hollow tone arm is denoted by the numeral 12. It comprises a hollow arm structure characterized by a flat horizontal top wall 14, parallel side walls 16, closed front end wall 18 and closed rearward end wall 20. This end portion 22 of the tone arm is pivotally and otherwise operatively mounted as at 24 and 26 on a stationary component 28 of the phonograph structure.

As is well-known in the art, a tone arm such as is shown at 12 is customarily or commonly provided in the hollow chamber portion with the required cartridge and pickup means. It will be evident, however, that the present concept constitutes an unusually distinct and different solution of the problem and, to the ends desired, the cartridge 30 (FIGS. 2, 3 and 4) is provided on its bottom with a suitably performing groove tracking stylus 32. An adapter plate is utilized to mount the cartridge so that it is automatically retractable. This adapter, as shown in FIG. 5 at 34, comprises a generally rectangular tiltable or cradling plate 36 of non-magnetic material such as for example, appropriate plastic material. This plate is provided on its top intermediate the ends with a transverse rib 38 which constitutes a reinforcing member and which in practice is provided with a bore 40 therethrough to accommodate a hinging and mounting pin 42 which as shown in FIG. 3 has end portions 44 constituting journals, said journals being journaled for rotation in bearing holes 46 (FIG. 4) provided therefor in the opposed side walls 16. The intermediate portion of the rib is provided with a screw-threaded socket to accommodate the screw-threaded end portion of a simple rod member 48 which constitutes and provides a trip lever or trigger. The rod extends through and beyond an elongated slot 50 provided therefor in the top wall of the tone arm. The exposed upper end of the rod or lever is provided with a suitable finger grip 52 which is intended to be caught hold of and operated in the manner to be later described. The cartridge 30 is removably screwed or otherwise fastened as at 54 on the end portion 56 of the cradling plate or adapter 34. The other half portion or end 58 is provided with an integrally mounted boss or button-like element 60 which is made of magnetizable material and is movable toward and from an electromagnet 62 which is mounted as at 64 and depends into the hollow portion of the cartridge chamber, the same being provided with suitable conducting and circuit make-and-break wires 66 and 67. The wires leading to the cartridge are denoted at 68 and 69. The numeral 70 designates an eye on the half portion 56 which cooperates with a similar eye 72 on the interior top wall of the tone arm, said eyes serving to accommodate hooks on the end portion of a properly tensioned and balanced coil spring 74. The numeral 76 designates an appropriate semi-spherical bumper made of rubber or the like which is suitably anchored in a socket member 78 attached to the top wall 14 and depending therefrom in proper alinement with the coacting end or half portion 56 of the cradling plate or adapter 34.

It will be evident that if during the operation of the record player the tone arm should accidentally be exposed to an unendurable sudden physical force which would be of such severity that it would result in damage to the grooves of the record's surface and if the record player is equipped with the present invention the stylus will react to this physical force by automatically retracting itself into the hollow portion of the tone arm thus preventing damage to the surface of the record. In fact, the only part of the tone arm that could then come into contact with the record would be the compressibly resilient lightweight foam plastic block 80, more particularly the protruding portion 82 thereof depending below the lower edges of the side walls as evident from FIGS. 1 to 4, inclusive. FIGS. 3 and 4 show the block resting on the record's surface while FIG. 2 shows the end portion 82 in a playing position spaced above the surface.

It will be understood that the cushioning or shock-absorbing block 80 is preferably made from foam plastic, rubber or equivalent soft and lightweight material with the proper shock-absorbing characteristics. This part should be strong enough to absorb any shock it may receive but at the same time soft enough that it will not damage the grooves of the record's surface.

In order to get the stylus 32 into the position shown in FIG. 2 it is first necessary that the record player be turned on. This will result in activating or energizing the electromagnet 62. However, this will not bring the stylus 32 into playing position. To do this it is necessary to catch hold of the grip 52 on the trip lever or trigger 48 and to cause it to rotate from right to left as shown in FIGS. 1 and 2. The electromagnet now exerts a force which is strong enough to attact and maintain during playback the element 60 in the manner shown in FIG. 2.

It can be briefly reiterated that when the stylus-equipped cartridge characterized by components 30 and 32 is subjected to abnormal vibration or shock the flow of current travelling through the wires 68 and 69 will be affected. This is to say the then existing abnormal electrical impulse will be used to turn off the current going through the wires 66 and 67 to the electromagnet 62. In practice this can be done by the use of an amplifier and an automatic switch (not shown). Accordingly, if the stylus accidentally strikes the grooves of a phonograph record it will be instantly pulled into the tone arm by the means shown and described and only the harmless buffer or limit stop 82 will touch the record. It will reduce and perhaps eliminate the possibility of the stylus damaging the record.

The foregoing is considered as illustrative only of the principles of the invention. Further, since numerous modifications and changes will readily occur to those skilled in the art, it not desired to limit the invention to the exact construction and operation shown and described, and accordingly all suitable modifications and equivalents may be resorted to, falling within the scope of the invention as claimed.

What is claimed as new is as follows:

1. For use on a phonograph, an elongated tone arm embodying interconnected top, side and end walls defining a hollow open-bottom chamber, a suitable wired sound-pickup cartridge having a record groove tracking stylus, cartridge cradling mean pivotally mounted on a horizontal axis between the side walls and having end portions vertically tiltable relative to said top wall and open bottom, said cartridge being operatively mounted beneath but on the bottom of said cradling means and movable in conjunction therewith, spring means yieldingly joining one end of said cradling means to said tone arm, and shock responsive electric current controlled means constituting and providing openable and closable coupling means between said tone arm and the other end of said cradling means.

2. The structure according to claim 1, and wherein said cradling means is provided with a manually actuatable trip lever having a finger-grippable and extending for accessible use through an opening provided therefor in said top wall.

3. The structure according to claim 2, and limit stop and shock absorbing means fitted into a front end portion of said chamber and having cushioning properties and adapted to rest yieldingly atop the phonograph's record playing surface and to thus minimize damage by preventing the tone arm from accidentally dropping and destructively "banging" said playing surface.

4. The structure defined in claim 3, and wherein said limit stop means comprises a block of foam plastic inserted in the terminal front end portion of said chamber and fastened in its functioning position by coacting portions of the front end wall and contiguous portions of the side walls, said block having a bottom marginal portion protruding and depending beyond the open bottom of said chamber.

5. The structure according to claim 1, and wherein said cradling means comprises an elongated plate confined for operation in the chamber between said side walls and having a median portion provided with hinge pintles journaled between said side walls.

6. An elongated tone arm embodying, top, side and end walls joined together in cooperating relationship and defining a hollow bottom chamber, the side walls adjacent a front end wall being provided with bearings, an elongated adapter plate arranged in said chamber, said plate being provided intermediate its ends with a rib, said rib having channel means at its ends and said channel means being journaled for oscillation in their respectively cooperable bearings, said rib dividing said plate into forward and rearward half portions, a stylus-equipped cartridge mounted on the bottom of one half portion, an electromagnet mounted on said top wall and projecting into said chamber, the cooperating half portion of said plate having a magnetizable element movable toward and from said electromagnet, and a coil spring interposed between the first-named half portion and connected therewith and also with said top wall.

7. The structure defined in claim 6 and in combination, a bumper carried by said top wall, said bumper being interposed between the top wall and a cooperating part of said half portion.

8. The structure defined in claim 6 and, in combination, a bumper carried by said top wall, said bumper being interposed between the top wall and a cooperating part of said half portion, said top wall being provided with a slot, and a trip lever carried by the median part of said rib and extending through said slot and terminating in an accessible finger grip.

References Cited by the Examiner

UNITED STATES PATENTS

| | | | |
|---|---|---|---|
| 3,074,726 | 1/1963 | Sioles et al. | 274—23 |
| 3,228,700 | 1/1966 | Andrews et al. | 274—23 |

NORTON ANSHER, *Primary Examiner.*